United States Patent [19]

Neeleman

[11] Patent Number: 5,205,369
[45] Date of Patent: Apr. 27, 1993

[54] FORCE MEASURING CELL

[75] Inventor: Christiaan Neeleman, Zülrich, Switzerland

[73] Assignee: Mettler - Toledo AG, Greifensee, Switzerland

[21] Appl. No.: 865,328

[22] Filed: Apr. 8, 1992

[30] Foreign Application Priority Data

Apr. 30, 1991 [CH] Switzerland ............... 1300/91

[51] Int. Cl.$^5$ .................. G01G 3/08; G01G 21/28
[52] U.S. Cl. ........................... 177/229; 177/244
[58] Field of Search ..................... 177/229, 244

[56] References Cited

U.S. PATENT DOCUMENTS

| 4,203,497 | 5/1980 | Harris et al. ........... 177/244 X |
| 4,505,345 | 3/1985 | Jetter ..................... 177/229 X |
| 4,732,228 | 3/1988 | Danhamer ............... 177/229 X |
| 4,798,251 | 1/1989 | Maaz et al. ............. 177/229 |
| 4,899,600 | 2/1990 | Lee .......................... 177/229 X |

FOREIGN PATENT DOCUMENTS 2-5375 2/1990 Japan .

Primary Examiner—George H. Miller, Jr.
Attorney, Agent, or Firm—Laubscher & Laubscher

[57] ABSTRACT

A force measuring cell includes a force receiving member (4) in the form of a parallelogram type deviating member the opposed ends of which are connected between the weighing pan carrier and the housing of a weighing apparatus. A fastening member (8) is provided having a fastening portion (8a) adapted for removable connection with either the housing member or the pan carrier member, and a connecting portion (8b) adapted for connection with the deviating member, the fastening and connecting portions being decoupled by a narrow transition zone (8c), whereby the fastening force or stress is virtually isolated from the connecting area.

11 Claims, 4 Drawing Sheets

FORCE MEASURING CELL

STATEMENT OF THE INVENTION

A force measuring cell for weighing apparatus includes a fastening member for connecting one end of a force receiving member of the parallelogram deviation type to a weighing pan carrier or to a housing, characterized in that a narrow transition zone is defined in the fastening member for isolating (i.e., decoupling) fastening and connecting portions thereof from each other.

BRIEF DESCRIPTION OF THE PRIOR ART

In the Japanese patent No. 53-80305, a force measuring cell is disclosed that is connected by connecting arm means with a fastening plate which is fastened by screws to the scale pan carrier or the scale housing, said fastening plate resting completely and rigidly on the associated component.

As a result, the connecting area is directly connected with the fastening area, by virtue of which mechanical tensions are transmitted from the fastening area into the connecting area. In particular, because of the contact of the fastening plate in the area of the axis of each connecting arm, forces and stresses resulting from the fastening—which could adversely effect the measurement results—are transmitted from the fastening plate area directly and without interruption via the connecting arm to the force measurement cell. This kind of construction can be used only to a very limited extent, and here one must rule out any use particularly in high-precision areas.

The purpose of the present invention therefore is to avoid the disadvantages of the weighing systems of the prior art and to create a force measurement cell that, also in high-precision ranges, will not cause any impairment of the measurement results by virtue of the fastening of the force measurement cell upon the structural parts of the scale.

BRIEF DESCRIPTION OF THE DRAWINGS

Other objects and advantages of the invention will become apparent from a study of the following specification when viewed in the light of the accompanying drawing, in which.

DETAILED DESCRIPTION

Figure 1:
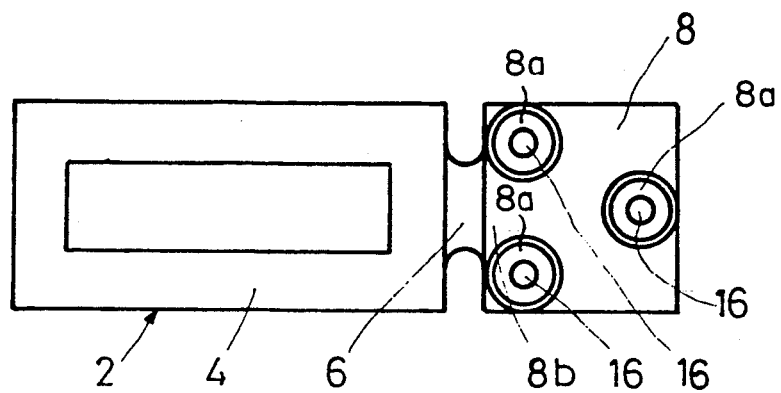
FIG. 1 is a bottom plan view of a first embodiment of the force measuring cell of the present invention.
Figure 2:
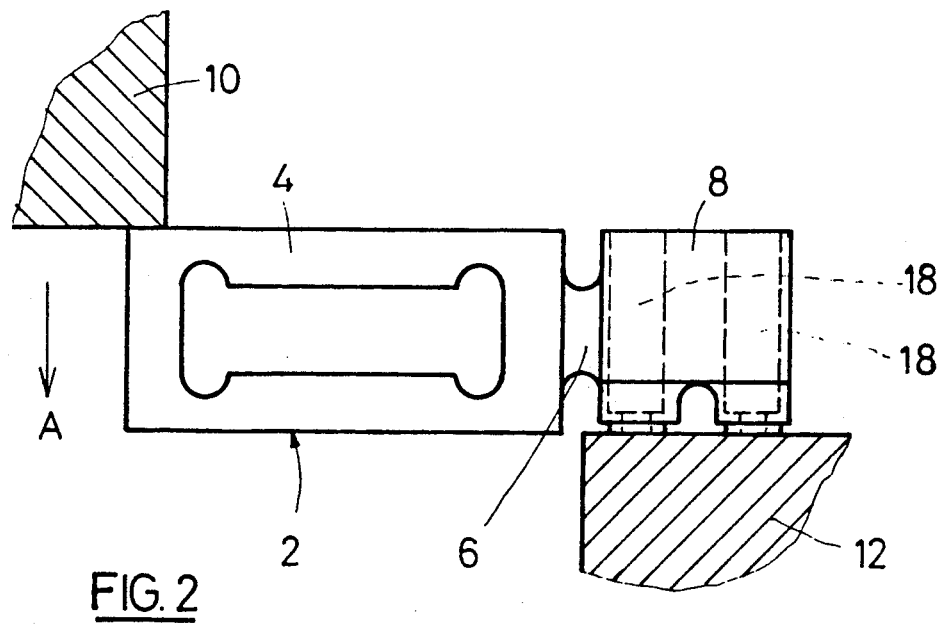
FIG. 2 is a side elevational view of the apparatus of FIG. 1.
Figure 3:
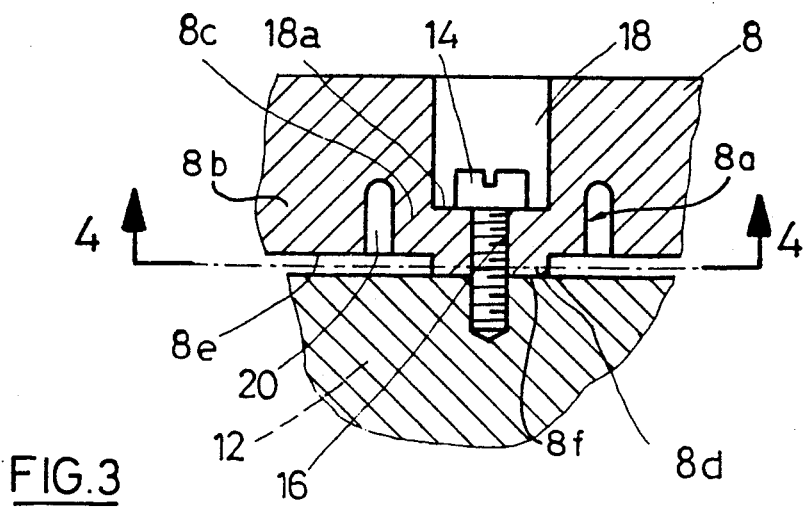
FIG. 3 is a detailed view of the fastening means of the sensor of FIGS. 1 and 2.
Figure 4:
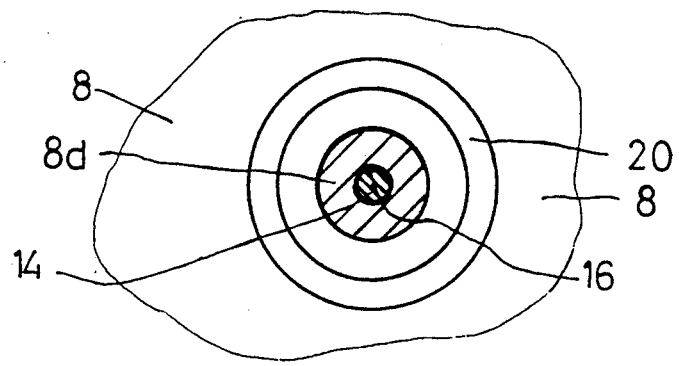
FIG. 4 is a sectional view taken along line 4—4 of FIG. 3.

Referring first more particularly to FIGS. 1-3, the force measuring cell 2 of the present invention includes a force measuring sensor 4 having the configuration of a parallelogram and which is connected at one end by central connecting arm 6 with a fastening member 8, whereby the sensor assembly may be connected, as shown in FIG. 2 between the force-applying scale pan carrier 10 and the scale housing 12. The fastening member 8 includes a fastening portion 8a that is virtually decoupled from a connecting portion 8b, in accordance with the present invention, by a transition portion 8c (FIG. 3). While only one fastening member 8 has been illustrated in FIGS. 1 and 2, it is apparent that a second fastening member could be connected with the other end of the sensor body 4 by a second central connecting arm, if desired. Each of the fastening members 8 includes at least one fastening portion 8a adjacent the contact fastening means, and a connecting area 8b adjacent the connecting arm 6. Each fastening portion is decoupled from the associated connecting portion by at least one transition portion 8c. The transition portion is preferably formed as a zone that is as narrow as possible and that deflects to isolate from the connecting area 8b the force or tension propagation produced by fastening screw means 14 (FIG. 3) at fastening locations on the fastening portion 8a. The fastening portion includes a disk-shaped hub portion 8d that projects axially toward the housing to which the device is to be connected, which hub portion has an end face 8f that engages the housing 2 (or the carrier 10 as the case may be). The fastening hub portion 8d is connected by narrow transition zone 8c with the remainder of the fastening member 8.

In the first embodiment, illustrated in FIGS. 1-3, the connecting portion 8b of the fastening body 8 is connected by central connecting arm 6 with the man sensor body 4. The fastening body 8 contains a through bore 16 having a counter-bore 18 for receiving the head portion of a fastening screw 14 that removably connects the fastening body 8 with the housing 12. The fastening body includes an annular hub portion 8d having an end face 8f that engages the housing 12, as indicated above. The head portion of screw 14 engages the bottom wall 18a of the counterbore 18, and the end face 8f of the hub portion 8d is offset from the adjacent end face 8e of the fastener member 8. Arranged concentrically about the hub portion 8d and the screw fastening means 14 is an annular groove 20 formed in the lower face 8e of the fastening member 8, thereby to define a narrow transition zone 8c between the groove 20 and the wall surface of the counterbore 18.

Alternatively, in place of the annular groove 20, the entire end face 8e between adjacent hub portions 8d and adjacent transition zones 8c, respectively, could be removed to form an offset essentially corresponding to the depth of the groove 20.

Figure 5:
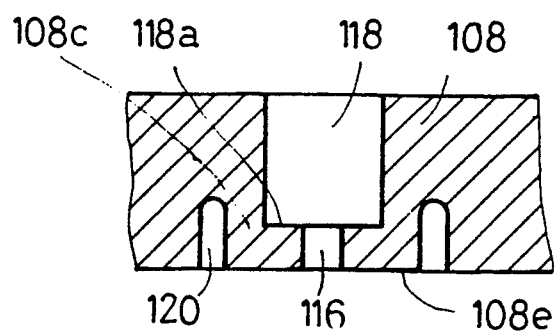
FIGS. 5-11 are detailed views of the fastener means of seven other embodiments of the invention, respectively.

Referring now to FIG. 5, a second embodiment is disclosed wherein the lower face 108e of the fastening member 108 is flush, the use of a projecting hub portion according to the previous embodiment having been eliminated. In this embodiment, the transition portion 108c is arranged between the annular groove 120 and the adjacent wall surface of the counterbore 118.

Figure 6:
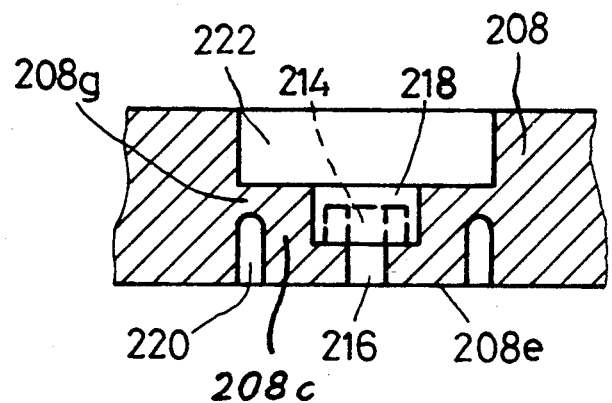

In the embodiment of FIG. 6, the fastening body 208 includes a through bore 216 that contains a first counterbore 218 and a second counterbore 222, the depth of the annular groove 220 being greater than the length of the through bore 216, whereby the groove is concentrically arranged about the first counterbore 218, thereby to define a first transition zone 208c arranged between the groove 220 and the first counterbore 218, and a second transition zone 208g arranged between the groove 220 and the second counterbore 222. Thus, the transition zones 208c and 208g define an annular area having an L-shaped cross-sectional configuration.

Figure 7:
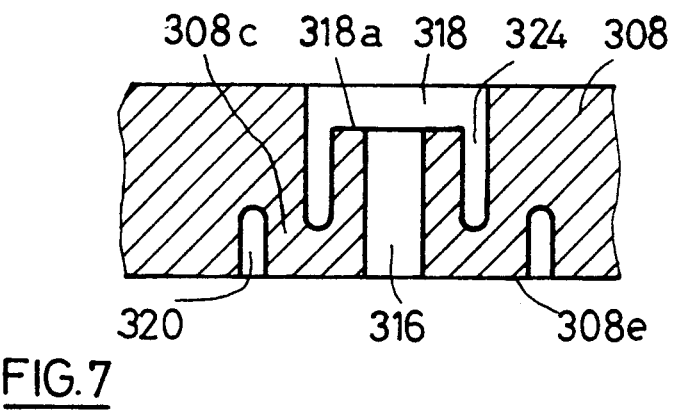

In the embodiment of FIG. 7, in addition to the first annular groove 320, there is arranged concentrically therein a second annular groove 324 that extends downwardly from the counterbore 318 concentrically within the first groove 320, thereby defining a narrow annular transition area 308c adjacent the bottom face 308e of the fastener member 308.

Figure 8:
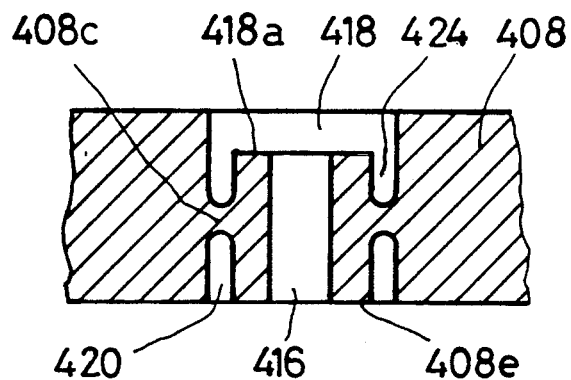

According to the embodiment of FIG. 8, the first annular groove 420 is arranged within the bottom face 408e of the fastener member 408 concentrically about the through bore 416, and the second annular groove 424 is provided in the bottom wall 418a of the counterbore 418, the two grooves having the same diameter, thereby to define between the grooves a narrow annular transition zone 408c arranged concentrically about the through bore 416.

Figure 9:
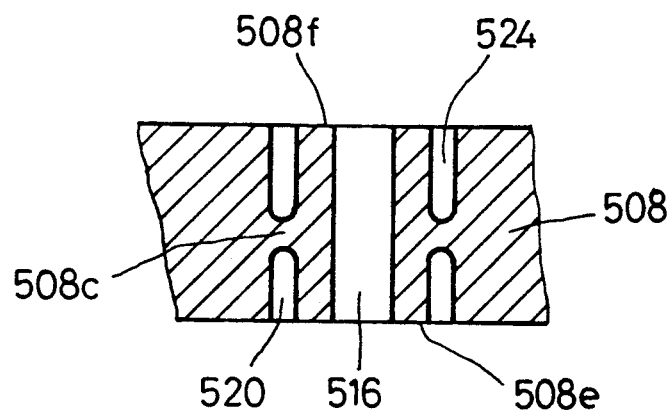

In the embodiment of FIG. 9, instead of the counterbore 418 of FIG. 8, the fastening body 508 contains in its lower surface 508e a first annular groove 520 arranged concentrically about the through bore 516, and a second groove 524 contained in the upper surface 508f of the fastener body, the grooves having the same diameter so as to define therebetween an annular transition zone 508c.

Figure 10:
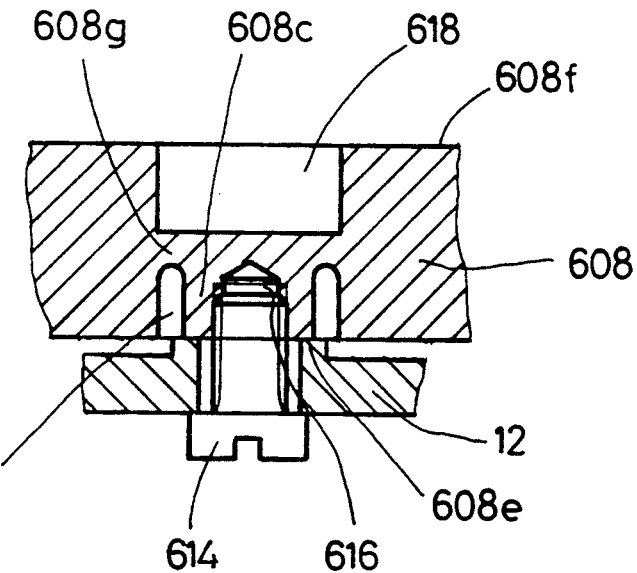

In the embodiment of FIG. 10, the partially tapped bore 616 defined in the lower face 608e of the fastening body 608 is screw threaded and does not extend completely through the body. The annular groove 620 contained in lower body surface 608e extends concentrically about the bore 616 and has a depth that is generally equal to that of the bore, thereby defining a first annular transition zone 608c between the adjacent walls of the groove 620 and the bore 616, and a second annular transition zone 608g between the bottom wall of the groove 620 and the bottom wall of the partial bore 618 formed in the upper surface 608f of the fastening body. The annular transition zones 608c and 608g define in cross-section an L-shaped configuration. In this embodiment the screw 614 extends upwardly from the housing for threaded connection with the bore 616.

Figure 11:
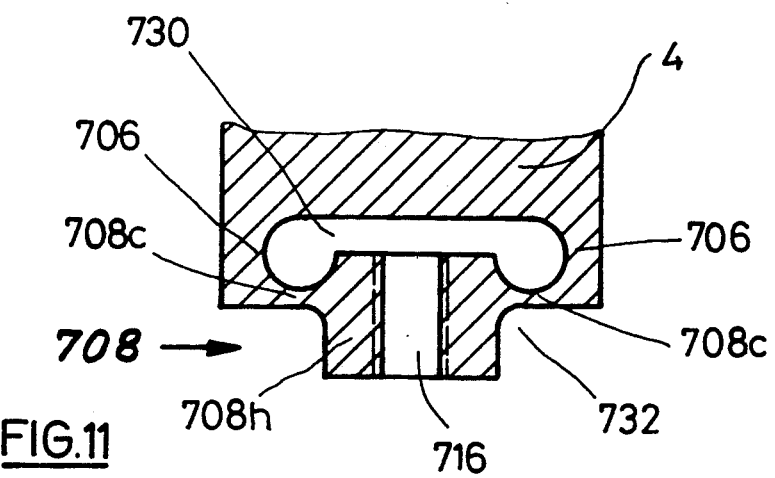

Finally, in the embodiment of FIG. 11, the fastening member 708 is connected with the rectangular sensor parallelogram body 4 by a pair of connecting arms 706 arranged on opposite sides of the vertical threaded bore 716 which communicates at its upper end with central chamber 730 contained within the sensor body. An external recess 732 is defined about the circular fastening neck portion 708h, and the central chamber cooperates with the recess to define oblong transition zone 708c arranged on opposite sides of the threaded bore 716. Thus, each transition zone 708c is integral with a connecting arm 706, whereby the connecting area comprises two decoupled connecting arms 706.

In these designs of the fastening means, according to the present invention, the connecting area is not directly connected with the fastening area; instead, there is an interruption between both of them and as a result the forces and stresses from the fastening area are not transmitted into the connecting area. In particular, in the area of the axis of each connecting arm, forces and stresses from the fastening area are not transmitted at all, or they are transmitted in a considerably reduced manner to the force measurement via the connecting arm. This makes for considerably more accurate measurement results.

The force measurement cell according to the present invention can be used in or with various force measurement principles, as, for example, cells with elastic measurement strips (i.e., strain gauges), or with oscillating strings as the measuring elements. Parallelogram cells with such measurement elements are known, and therefore it is not necessary to include in the drawing and description the manner of installation or attachment of the measurement elements, especially since this is immaterial as regards the understanding of the invention at hand.

While the above-described embodiments are shown to have a connecting arm 6 as part of the connecting area, it is to be understood that this is a preferred embodiment only. In other embodiments this connecting arm 6 may be of a different configuration, or even dispensed with completely (in which event the connecting area 8b might be integral with the adjacent part of the force measuring cell 2 [for example, the parallelogram member 4]).

What is claimed is:

1. A force measuring cell for use in a weighing apparatus having a weighing pan carrier member (10) movably connected with a housing member (12), comprising:
   (a) a parallogram-type deviating member (4), which deviates under load; and
   (b) means for removably connecting one end of said deviating member with one of said housing and pan carrier members, said connecting means including a fastener member (8) having a fastening portion (8a) in engagement with said one member, a connecting portion (8b) adjacent said deviating member, and a transition zone (8c) operable to decouple said fastening portion from said connecting portion with respect to mechanical stress.

2. Apparatus as defined in claim 1, wherein said transition zone comprises a narrow annular zone (8c) arranged concentrically about each of the fastening points between said fastening member and said one member.

3. Apparatus as defined in claim 2, wherein said groove is contained in a face (8e) of said fastening member that is adjacent said one member.

4. Apparatus as defined in claim 2, wherein the transition zone is arranged inwardly of and in spaced relation to the face of said fastening member that is adjacent said one member.

5. Apparatus as defined in claim 2, wherein said transition zone is arranged remotely relative to the face of said fastening member that is adjacent said one member.

6. Apparatus as defined in claim 2, wherein said transition zone (308c) is arranged on the face (308e) of said fastening member that is adjacent said one member.

7. Apparatus as defined in claim 1, wherein said fastening member includes a hub portion (8d) having a first face in contiguous engagement with said one member, said hub portion containing a longitudinal bore (16) for receiving a fastening component, said transition zone serving to connect said hub portion with said fastening area.

8. Apparatus as defined in claim 7, wherein said transition zone extends concentrically between said hub portion and said fastener member, said groove being formed in a face of said fastening member that is remote from said one member.

9. Apparatus as defined in claim 7, wherein the axis of said longitudinal bore extends parallel with the direction of application of the force (A) to said deviating member.

10. Apparatus as defined in claim 7, wherein the axis of said longitudinal bore extends normal relative to the direction of application of force (A) to said deviating member.

11. Apparatus as defined in claim 1, and further including a connecting arm (6) connecting said fastening member with said deviating member.

* * * * *